(12) United States Patent
Kawas et al.

(10) Patent No.: US 8,362,637 B2
(45) Date of Patent: Jan. 29, 2013

(54) METHOD AND APPARATUS FOR WIND ENERGY SYSTEM

(76) Inventors: Percy Kawas, Los Altos, CA (US); Gulnar Kawas, Los Altos, CA (US)

( * ) Notice: Subject to any disclaimer, the term of this patent is extended or adjusted under 35 U.S.C. 154(b) by 0 days.

(21) Appl. No.: 13/107,921

(22) Filed: May 15, 2011

(65) Prior Publication Data

US 2011/0221196 A1 Sep. 15, 2011

Related U.S. Application Data

(63) Continuation-in-part of application No. 12/968,126, filed on Dec. 14, 2010.

(51) Int. Cl.
*F03D 9/00* (2006.01)
*H02P 9/04* (2006.01)
(52) U.S. Cl. .......................... 290/55; 290/44
(58) Field of Classification Search .............. 290/44, 290/55
See application file for complete search history.

(56) References Cited

U.S. PATENT DOCUMENTS

| | | | | |
|---|---|---|---|---|
| 3,883,750 A * | 5/1975 | Uzzell, Jr. | ......................... | 290/55 |
| 3,994,621 A * | 11/1976 | Bogie | ......................... | 415/186 |
| 4,075,500 A | 2/1978 | Oman et al. | ......................... | 290/55 |
| 4,079,264 A * | 3/1978 | Cohen | ......................... | 290/55 |
| 4,088,419 A * | 5/1978 | Hope et al. | ......................... | 415/4.4 |
| 4,143,992 A | 3/1979 | Crook | ......................... | 415/220 |
| 4,166,596 A | 9/1979 | Mouton, Jr. et al. | ......................... | 244/30 |
| 4,204,799 A | 5/1980 | de Geus | ......................... | 415/4.5 |
| 4,289,444 A * | 9/1981 | Monk et al. | ......................... | 415/4.2 |
| 4,309,146 A * | 1/1982 | Hein et al. | ......................... | 415/4.4 |
| 4,486,143 A * | 12/1984 | McVey | ......................... | 415/164 |
| 4,508,973 A * | 4/1985 | Payne | ......................... | 290/55 |
| 4,551,631 A * | 11/1985 | Trigilio | ......................... | 290/55 |
| 4,816,697 A | 3/1989 | Nalbandyan et al. | ......................... | 290/54 |
| 4,868,408 A | 9/1989 | Hesh | ......................... | 290/52 |
| 4,963,761 A * | 10/1990 | Wight | ......................... | 290/55 |
| 5,391,926 A * | 2/1995 | Staley et al. | ......................... | 290/55 |
| 5,457,346 A | 10/1995 | Blumberg et al. | ......................... | 290/55 |
| 5,664,418 A * | 9/1997 | Walters | ......................... | 60/398 |
| 5,852,331 A * | 12/1998 | Giorgini | ......................... | 290/55 |
| 5,977,649 A | 11/1999 | Dahill | ......................... | 290/55 |
| 5,982,046 A * | 11/1999 | Minh | ......................... | 290/55 |
| 6,109,863 A | 8/2000 | Milliken | ......................... | 415/1 |
| 6,191,496 B1 * | 2/2001 | Elder | ......................... | 290/55 |
| 6,352,473 B1 * | 3/2002 | Clark | ......................... | 454/19 |
| 6,448,669 B1 * | 9/2002 | Elder | ......................... | 290/54 |
| 6,582,291 B2 * | 6/2003 | Clark | ......................... | 454/19 |
| 6,638,005 B2 * | 10/2003 | Holter et al. | ......................... | 415/4.2 |
| 6,666,650 B1 * | 12/2003 | Themel | ......................... | 416/200 R |
| 6,710,469 B2 * | 3/2004 | McDavid, Jr. | ......................... | 290/55 |
| 6,740,989 B2 * | 5/2004 | Rowe | ......................... | 290/55 |
| 6,749,393 B2 * | 6/2004 | Sosonkina | ......................... | 415/4.1 |
| 6,841,894 B2 * | 1/2005 | Gomez Gomar | ......................... | 290/55 |
| 6,870,280 B2 * | 3/2005 | Pechler | ......................... | 290/55 |
| 7,242,108 B1 * | 7/2007 | Dablo | ......................... | 290/55 |

(Continued)

FOREIGN PATENT DOCUMENTS

GB 228328 A 5/1995

*Primary Examiner* — Pedro J Cuevas
(74) *Attorney, Agent, or Firm* — Sughrue Mion, PLLC

(57) ABSTRACT

The description relates to generating power using wind energy. The current disclosure provides an opportunity to develop a new energy generating resource. According to some aspects, the apparatus uses a passive device to capture wind, and accelerate the wind toward a turbine and other fan or turbine blades to generate power in a confined structure. The foot print of the current design is scalable to individual users or businesses such as homes, industrial facilities, small business sites, as well as small power utilities such as wind farms. The passive devices to capture wind can have active electronic or mechanical controls to control the amount of wind flowing in the structure to generate power.

12 Claims, 10 Drawing Sheets

U.S. PATENT DOCUMENTS

| | | | |
|---|---|---|---|
| 7,288,850 B2* | 10/2007 | Hicks et al. | 290/44 |
| 7,323,791 B2* | 1/2008 | Jonsson | 290/55 |
| 7,329,965 B2* | 2/2008 | Roberts et al. | 290/55 |
| 7,400,057 B2* | 7/2008 | Sureshan | 290/55 |
| 7,679,206 B1 | 3/2010 | Green | 290/44 |
| 7,834,477 B2* | 11/2010 | Sheikhrezai | 290/55 |
| 7,863,765 B2* | 1/2011 | Yang | 290/44 |
| 7,866,938 B2* | 1/2011 | Kariya | 415/4.4 |
| 7,880,323 B2 | 2/2011 | Menges | 290/55 |
| 2001/0004439 A1* | 6/2001 | Bolcich et al. | 416/9 |
| 2002/0068519 A1* | 6/2002 | Clark | 454/19 |
| 2003/0035725 A1* | 2/2003 | Sosonkina | 416/11 |
| 2003/0133782 A1* | 7/2003 | Holter et al. | 415/4.2 |
| 2004/0183310 A1 | 9/2004 | Mowll | 290/55 |
| 2005/0029817 A1 | 2/2005 | Gizara | 290/43 |
| 2008/0023964 A1* | 1/2008 | Sureshan | 290/55 |
| 2008/0050237 A1* | 2/2008 | Lee | 416/197 A |
| 2008/0131281 A1* | 6/2008 | Kariya | 416/183 |
| 2009/0015019 A1* | 1/2009 | Donaghey | 290/55 |
| 2009/0160195 A1 | 6/2009 | Culjak | 290/55 |
| 2009/0238676 A1 | 9/2009 | Marvin | 415/4.3 |
| 2010/0034649 A1* | 2/2010 | Taylor | 415/208.1 |
| 2010/0124507 A1 | 5/2010 | Wallace et al. | 416/248 |
| 2010/0296928 A1 | 11/2010 | Falcone et al. | 416/120 |
| 2011/0095538 A1* | 4/2011 | Tabe | 290/55 |
| 2011/0135443 A1* | 6/2011 | Cucci et al. | 415/1 |
| 2011/0140450 A1* | 6/2011 | Kawas et al. | 290/55 |
| 2011/0250069 A1* | 10/2011 | Quintal | 416/111 |
| 2012/0099977 A1* | 4/2012 | Churchill et al. | 415/185 |
| 2012/0153632 A1* | 6/2012 | Suttisiltum | 290/55 |
| 2012/0175882 A1* | 7/2012 | Sterling et al. | 290/55 |

* cited by examiner

METHOD AND APPARATUS FOR WIND ENERGY SYSTEM

CROSS-REFERENCE TO RELATED APPLICATIONS

The present application is a continuation-in-part of application of U.S. patent application Ser. No. 12/968,126 and claims priority to U.S. application Ser. No. 12/968,126 filed on Dec. 14, 2010, the contents of which are incorporated herein by reference in its entirety.

FIELD OF THE INVENTION

The present invention relates generally to generating power using wind energy, and more particularly to methods and apparatuses to capture and accelerate in a confined structure.

BACKGROUND

The use of wind energy as an alternative energy source has been studied for a long time and has recently gained even more interest. Current wind turbine systems typically require large turbine blades to capture the wind energy, leading to negative impact on wild life, environment, as well as aesthetics. They are also cost prohibitive.

SUMMARY

The present application relates to generating power using wind energy. According to some aspects, the embodiment uses a passive device to capture wind, and accelerate the wind toward off-the-shelf or purpose built turbines and other fan blades to generate power in a confined structure. The instant application shows that the energy generation may be made cost effective by designing passive structures for capture of wind and to generate energy using natural resources such as wind.

According to some aspects, an apparatus according to the disclosure includes one or more wind-catching segments, each segment having an outer opening for receiving wind, an inner opening for exhausting the wind to an inner chamber of the apparatus, and an accelerating portion for accelerating the wind from the outer opening to the inner opening.

In one embodiment, the apparatus has variable foot print. It may be scaled to individual off-grid users, installed for individual users such as households and in another embodiment it may be scaled big to fit the wind farms.

According to other aspects, an apparatus according to the instant disclosure includes a plurality of wind-catching segments, each segment having an outer opening for receiving wind, an inner opening for exhausting the wind to an inner chamber of the apparatus, and an accelerating portion for accelerating the wind from the outer opening to the inner opening, wherein the plurality of wind-catching segments are arranged in a substantially contiguous manner completely surrounding the inner chamber, so as to catch wind from a plurality of different directions with respect to the apparatus.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIG. 12 also shows how the apparatus is located on single family homes or single story buildings multi-story apartment buildings.

DETAILED DESCRIPTION

The present embodiments will now be described in detail with reference to the drawings, which are provided as illustrative examples so as to enable those skilled in the art to practice the invention. Notably, the figures and examples below are not meant to limit the scope of the present disclosure to a single embodiment, and other embodiments are possible by way of interchange of some or all of the described or illustrated elements. Moreover, where certain elements of the present disclosure can be partially or fully implemented using known components, only those portions of such known components that are necessary for an understanding of the present embodiments will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such.

According to certain aspects, the embodiments relate to a method and device for catching and accelerating wind for purposes of generating wind energy, providing ventilation, etc.

Figure 12:
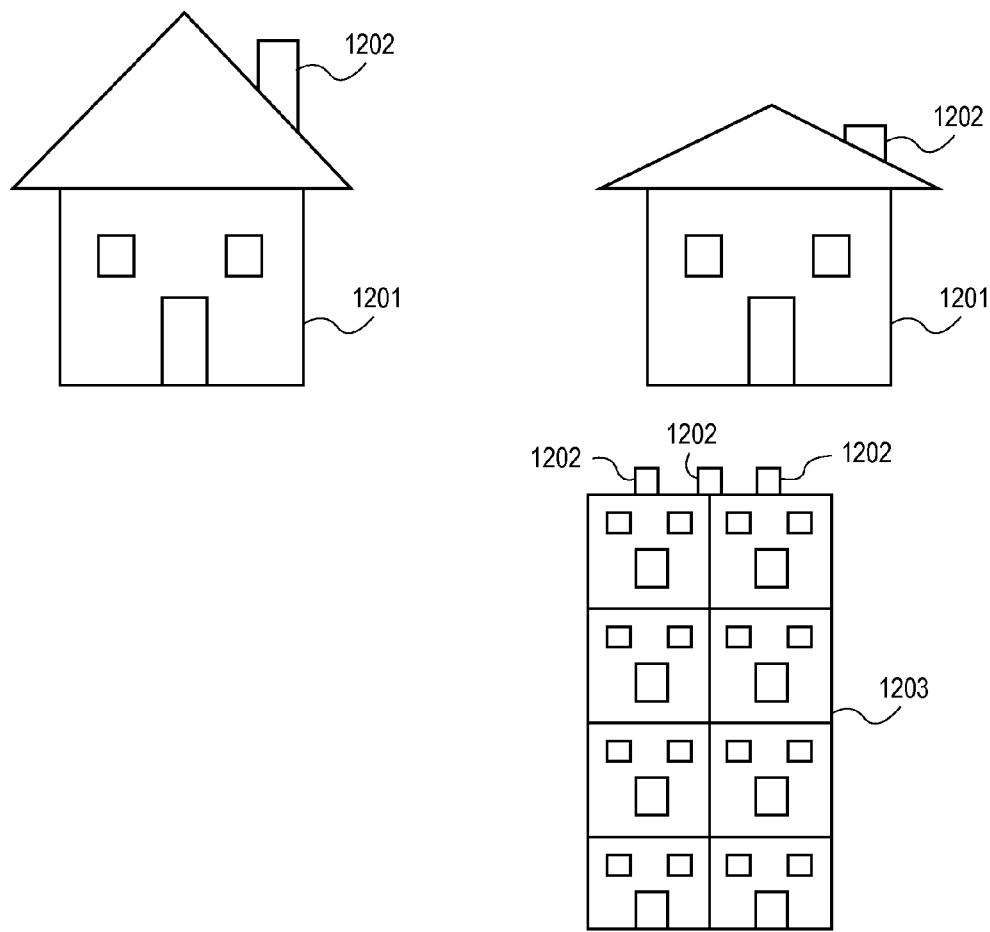

In embodiments, a device (as shown in FIG. 12, 1202) according to the instant description is affixed to a structure (as shown in FIG. 12 1201 and 1203) such as the roof of a building or a turbine and includes one or more wind-catching segments so as to capture wind from a plurality of different directions (as opposed to being rotatable in conjunction with the wind direction as in a conventional free-standing wind turbine, for example).

Figure 1:
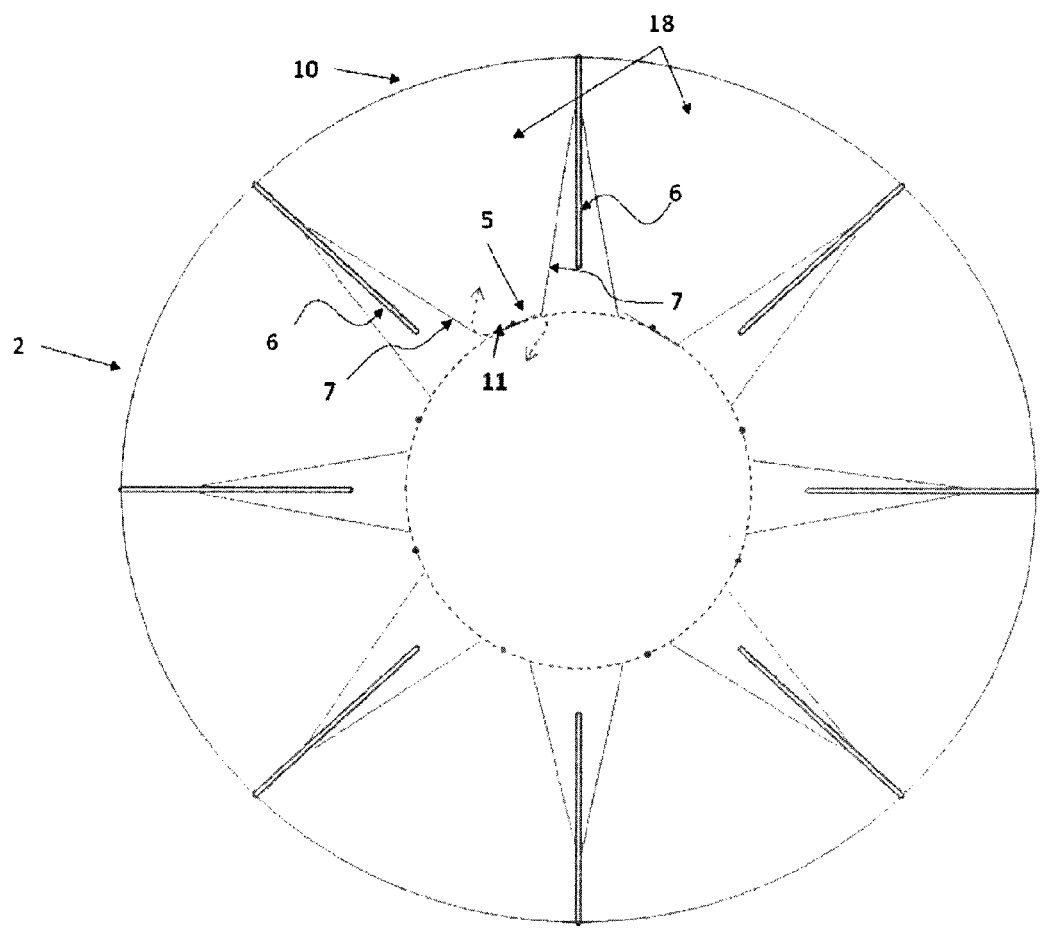
FIG. 1 is a top view illustrating one example wind catching apparatus according to embodiments.

FIG. 1 is a top view of a wind-catching device according to one possible implementation of such an embodiment. In this example, the wind-catcher device 2 includes eight wind-catching segments 18 arranged contiguously in a circular shape, and which together define the outer periphery 10 of the overall structure of device 2. There could be more or fewer such individual segments 18, depending on the application. Moreover, all segments need not be the same size. In this embodiment, the circular shape allows the air to flow from any direction from outer periphery 10 to interior wall 11, even when device 2 is stationary (e.g. affixed to a pole or building roof).

More particularly, in segment(s) 18 facing a wind direction, air enters in from outer periphery 10 and exits out through interior wall 11. In some embodiments, the opening at outer periphery 10 can be covered with a protective net or a mesh or other porous or permeable membrane to allow air in but keep other foreign particles, birds or other animals out.

As shown in FIG. 1, the side walls 7 are tapered from outer periphery 10 to interior wall 11 to reduce the cross sectional area of the segment 18 between 10 and 11. According to some aspects of the embodiments, the reduction in the area increases the velocity of the air flowing from outer periphery 10 to interior wall 11.

Figure 5:
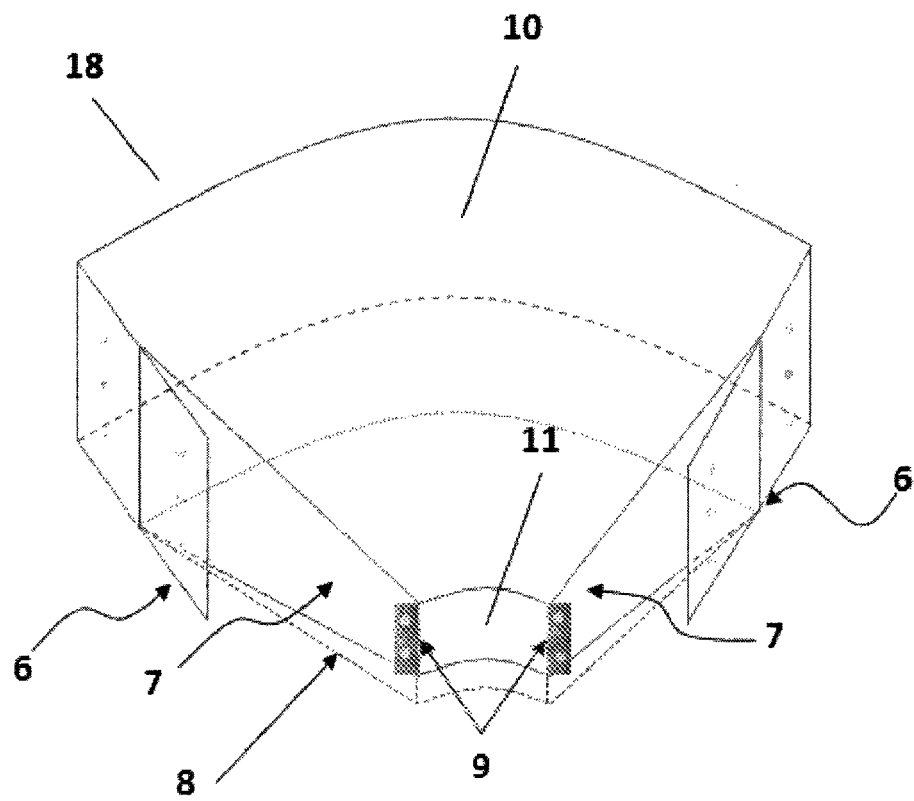

Support for the structure is provided by walls 6. Each segment 18 is connected to device 2 by bolting or harnessing it to respective walls 6. Further strength can be provided by adding structures such as trusses or beams from segment 18 to an inner structure within interior wall 11 (or flanges such as shown in FIG. 5, for example).

In one example embodiment, device 2 is fabricated mainly using 1/16 and 1/8 inch aluminum. However, this example is not limiting and other materials such as sheet metal, fiberglass, cloth, glass, steel, plastic, iron, etc. may be used alone or in any combination together.

In some embodiments to be described in more detail below, the air flow through a segment 18 can be controlled by a vent shown by 5. The vent opens and closes over the area of the segment 18 that is bounded by 11.

It should further be noted that, although not shown, dampening material and/or sound mufflers can be used in some embodiments between certain elements to reduce vibration and/or noise as should be apparent to those skilled in the art.

Figure 2:
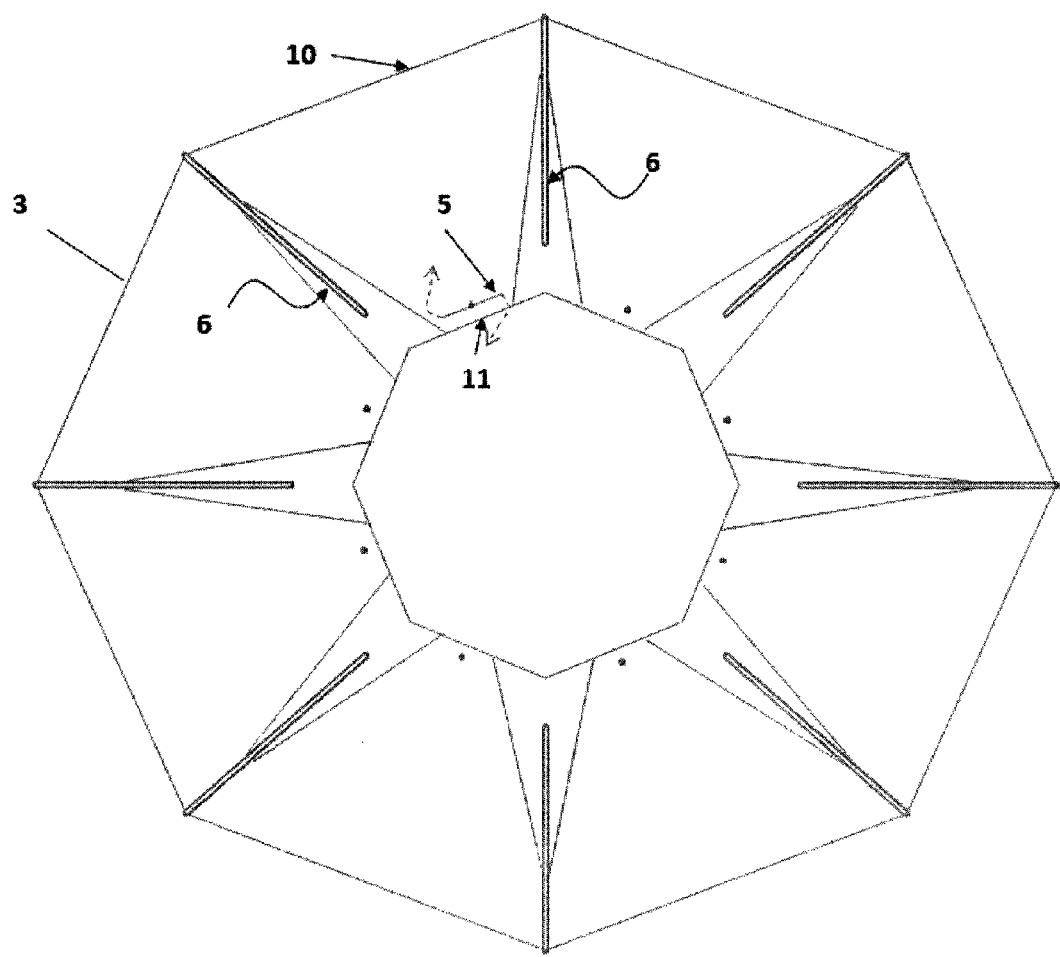
FIG. 2 is a top view illustrating another example wind catching apparatus according to embodiments.

FIG. 2 is a top view illustrating an alternative implementation of device 3, in which case the segments 18 are not rounded at the edge, such that the shape of outer periphery 10 is octagonal instead of circular. The descriptions of all like-numbered elements from FIG. 1 remain the same.

Figure 3:
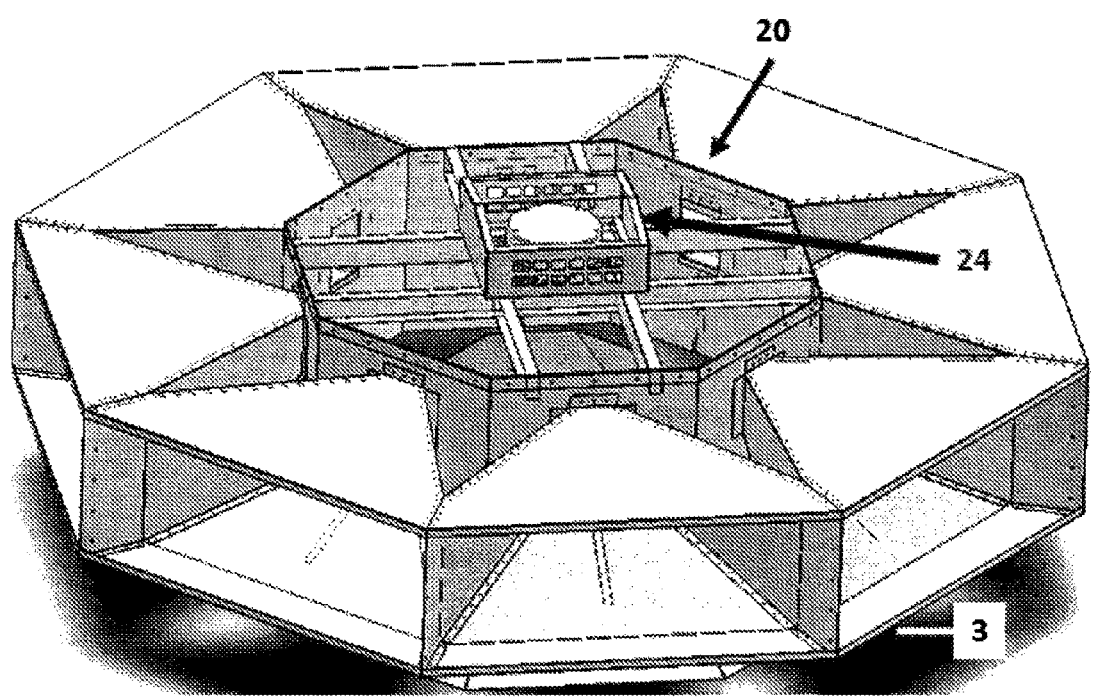
FIG. 3 is an assembly view of a wind energy system according to embodiments.

FIG. 3 shows a final assembly view of the implementation of device 3 shown in FIG. 2. The central (inner) housing 20 having wall 12 (shown in FIG. 7A) that is defined by interior walls 11 of segments 18 can contain a rotor and alternator(s). The housing 24 on top (as shown here, but can also be on the bottom or other locations on the structure in other embodiments) can also hold other electrical connectors, diodes, switches, electronic controls, brakes, inverters, etc. This housing can also be mounted on the side in other embodiments to be described below. The top of the structure can be flat or can be at an angle or any other shape. On a flat or other structure, additional structures or devices can be installed. For example, solar panels can be mounted on the top surface to create a hybrid solar-wind energy generation system. In embodiments, the overall structure and segments can create an overall aerofoil structure so as to push the structure downward in case of high wind, for example. One advantage of the overall aerofoil is to minimize the risk of the structure flying off the roof in high wind. With an aerofoil structure, high velocity winds flow around the structure and the aerodynamics exert a downward pressure, providing additional stability to the overall mounting hardware.

It should be noted that the segment and overall structure dimensions may vary based on many variables, such as known location and average wind velocity, and those skilled in the art will appreciate that the overall size of the structure will determine the amount of wind captured, and power generated. Many variations in sizes are possible, while remaining within the scope of the invention. In one example, for an average office, a 5 KW unit could occupy an area bound by between 10 and 15 feet in diameter. Depending on the brand of the alternator used, however, the starting torque for the same wind speed would cause the unit to occupy a larger area. For example, for the same cut in speed, a different brand would cause the unit to occupy an area 15 to 20 feet in diameter. Those skilled in the art will appreciate that many variables besides the amount of wind captured could affect the dimensions required for a target amount of energy.

Figure 4:
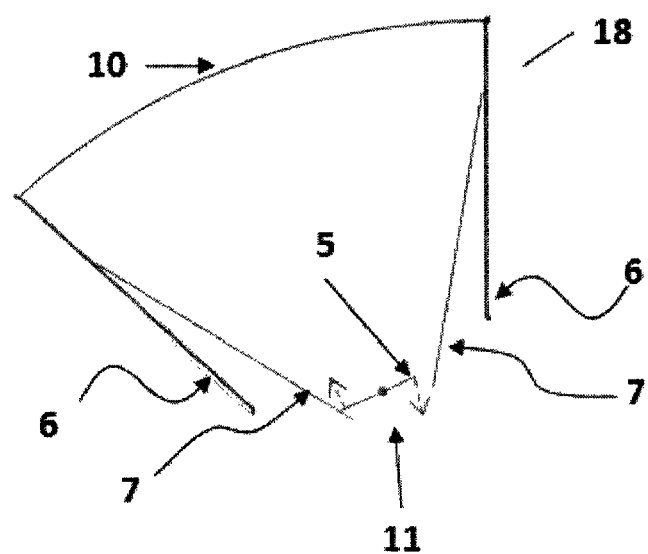
FIGS. 4 and 5 provide different views illustrating a segment of a wind catching and wind accelerating apparatus according to embodiments.

FIG. 4 illustrates an example of individual segment 18 in more detail. The segment shown in FIG. 4 has a circular outside edge such as that shown in FIG. 1.

At opposite side walls 7, the segment 18 is attached to walls 6 which provide rigidity, support, and strength to the overall structure. Each of the segments is connected to each other using screws or nuts to bolt the segments together. In some embodiments, walls 6 and sidewalls 7 can be combined into one structure which can be slid into a slot separated by two plates, effectively providing similar structure as the overall system design.

As shown in FIG. 4, and according to aspects of the embodiments, the sidewalls 7 taper in, providing a smaller area at an end adjacent to interior wall 11 as compared to the opening at outer periphery 10. As described earlier, wind enters in from the opening at outer periphery 10 and exits out from the end adjacent to interior wall 11.

As mentioned above, an optional vent 5 enables control on the wind inflow. The vent can be a simple vent (spring loaded) or active control. For example, each of the vents 5 for each of the segments can be opened or closed with a motor (not shown). A sensor (not shown) for wind speed and/or direction can be monitored and used to control which vents 5 open or close the vent to optimize flow of air into the inner housing 20. For example, if wind is coming from a certain direction, the vent 5 for the one segment oriented most in the direction of the wind can be opened, while all other vents 5 are closed. Alternatively, the vent 5 for the segment oriented most opposite the direction of the wind can be closed, while all other vents 5 are opened. Those skilled in the art will recognize many possible variations of how vents 5 can be controlled based on monitored wind speed/direction after being taught by this example. For example, a motor can control the vent and a controller (e.g. microcontroller with associated control code) can cause the motor to open or close the vent based on wind velocity and direction. In another example, there could be flaps on the walls of the segment. These flaps could be spring loaded and/or configured with active electronics controls to open as the wind speed increases. In a simple embodiment, the tension of the spring keeps the flaps closed until the wind speed and pressure from the wind increases. Once the flaps open, the wind is diverted out instead of toward the interior wall. An anemometer coupled to the controller can measure the wind speed, and based on the wind speed, the controller can instruct the appropriate motor(s) to open or close the associated vent(s) or flap(s) based on safety, efficiency, and other factors associated with overall operation of the structure.

FIG. 5 is a perspective view of a segment 18 such as that shown in FIG. 4. The area of segment facing outer periphery 10 is where air comes in and is directed to the inside wall 11. The flange 9 provides a means for harnessing a segment 18 to the inner housing 20 where the alternator and the rotor turbine are enclosed.

Figure 6:
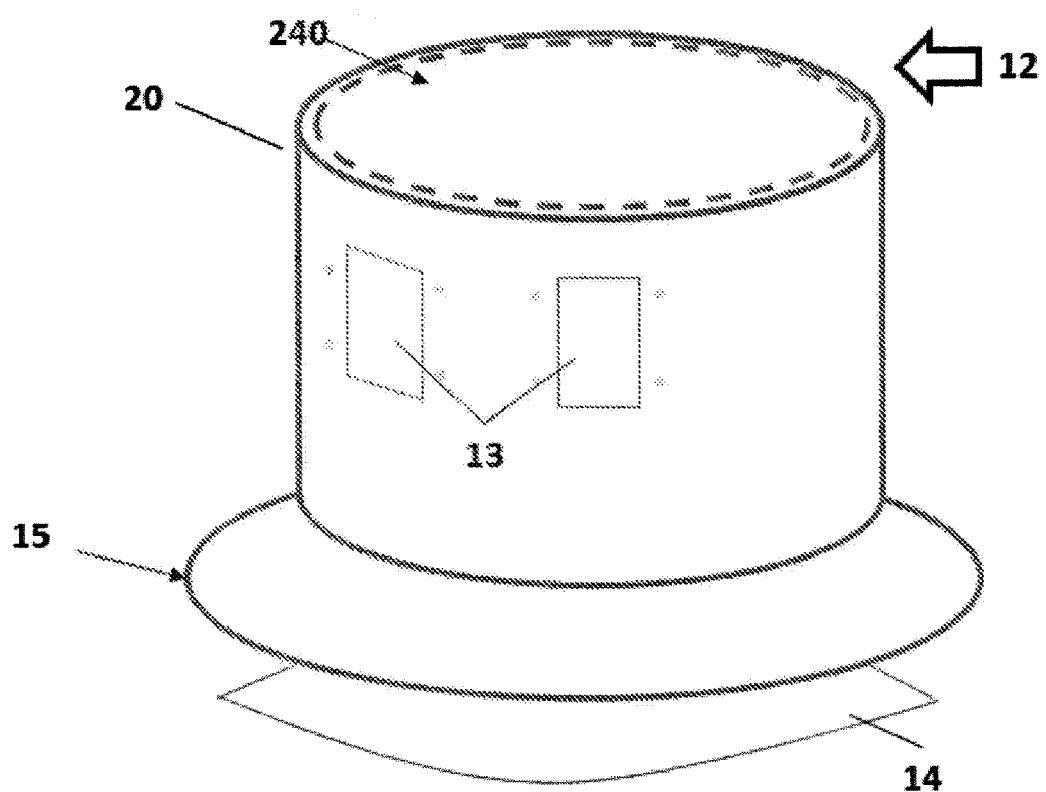
FIG. 6 illustrates an inner structure of a wind energy system according to embodiments.

FIG. 6 is a perspective view of one example implementation of inner housing 20 according to embodiments.

The lid 240 closes the inner structure 20 and provides protection to the devices contained in the inner structure (e.g. turbine, alternator, etc.). Openings 13 in the inner structure mate with openings in segments 18 abutting the interior wall 11, such as via flanges 9, to provide an additional means for connecting the segments together and to the inner structure. It should be noted that opening 13 (or portion of wall 11) could be covered with a mesh or net or other similar structures to prevent wild life such as birds or butterflies from entering the inner structure 20.

More particularly, for each segment 18, where the air exits through interior wall 11, there is a corresponding opening 13, thus providing a path for the air from the outside of the device to the inner structure. Those skilled in the art will appreciate that the combinations of the separate structures shown as 11 and 13 can be modified into one or more structures to create different derivative designs of the overall device after being taught by this example. For example, the structure can be built using two cylindrical metallic or plastic or other drums. One drum has a larger diameter than the other drum. The drums are positioned one on the inside of the other. Segments can be created using sheet metal plates cut to size and welded to the drums or held in place using screws, bolts, nuts, etc. Slots are cut out of both drums to match the openings created by the segments, and the rotor is mounted inside the inner drum.

For stability and vibration dampening, the inter segment gap is preferably sealed with a sealant to prevent water and other materials from accumulating in between causing long term fatigue and other structural issues. The sealant material can be any suitable material usually used for sealing structures on the roof and meets code and other safety standards. The sealant material is also preferably flexible, dampening any vibrations arising from operation.

Diffuser 14 provides diffusion for air coming in through openings 13 and out of the inner housing of device 2, for example after passing through a turbine. Molding 15 provides aesthetics and support for the overall structure. Molding 15 can have bolts for bolting down the structure 2 to a flat surface.

Figure 7A:
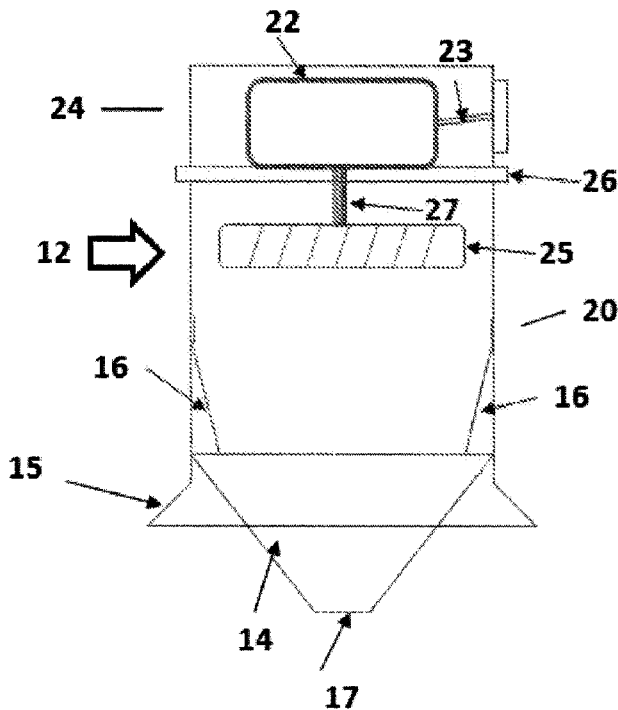
FIGS. 7A and 7B further illustrate an inner structure of a wind energy system according to embodiments.
Figure 7B:
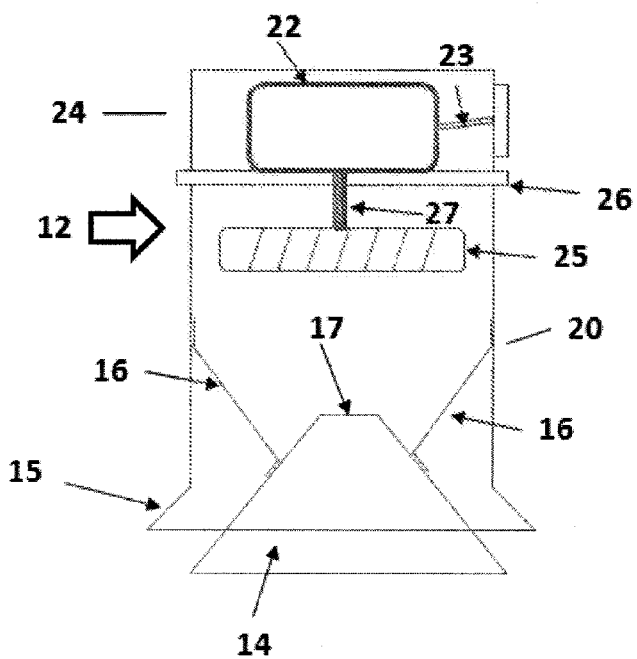

FIGS. 7A and 7B further explain the example embodiments of the inner structure according to one aspect of the embodiment. In these embodiments, the inner structure can include two separate units.

More particularly, as shown in FIGS. 7A and 7B, a top inner structure 24 holds an alternator 22 connected to lid 240 and/or a support plate 26. The electronics and electrical connections are stored in the housing shown as 24. The wiring from the housing 24 to the alternator is shown as 23 and can be a conduit pipe or a flexible conduit. Additionally, safety circuits can be connected via 23 and 24. For example, an anemometer can be connected via logic circuitry (e.g. a microcontroller and associated code) and a relay to disconnect the generator in case of high wind velocity via 23 and 24.

The top inner structure alternator 22 is connected to a shaft 27 which connects to a rotor 25 in lower structure 12. Additionally or alternatively to alternator 22, the power generation assembly can include a dynamo or other means of producing AC or DC voltage and current (power) when the rotor 27 is turned by the fan blades or turbine 25. The rotor 25 can be designed simply by connecting two plates with several vanes, straight or aerodynamically designed. Alternately a Savonius or a Darrieus rotor or other types or rotors and their combinations can be used for rotor 25. Moreover, rotor 25 can consist of other forms such as a Patton wheel or other forms of a wind collection and rotation device.

Internal supports 16 provide the necessary support and stability for the exhaust structure 14. The supports can be connected together with dampening material in between or non vibration material to reduce overall noise and vibration. They can also be welded or harnessed together. Support 16 is also designed to provide acceleration to wind exhausting 24 via exhaust structure 14. This could be beneficial if the structure 14 is connected to air ducts or other building climate control systems.

The air flowing into structure 12 (via openings 13, for example), and after impinging on rotor 25, gets directed by duct 16 to an exhaust collector 14. The air exits out through exhaust opening 17. As shown in FIG. 7A, the air exhaust can be configured to be tied to air ducts, attic cooling systems or other ducts if needed. Otherwise, as shown in FIG. 7B, the exhaust structure 14 could be inverted for proper exhaust of the air back into the outside environment. It should be noted that the air exhaust structure can be optional. It should be further noted that the exhaust opening 17 can be open or covered with a protective net or a mesh or other porous or permeable membrane to allow the flow of air, but keep other foreign particles, birds or other animals out.

The connecting lip/molding 15 is used for stationing the system on a flat surface. The lip 15 can also be bolted down for overall stability of the contraption.

Figure 8:
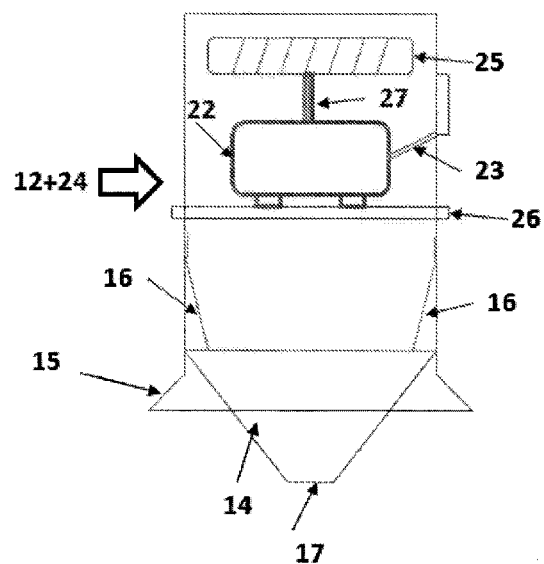
FIG. 8 further illustrates another example of an inner structure of a wind energy system according to embodiments.

In the example shown in FIG. 8, the inner structure is simplified by combining the two inner units. Instead of having two separate units such as those shown in FIGS. 7A and 7B, there is one chamber 12+24 which houses the rotor and the alternator.

All the details are the same as the previous slide. In this example embodiment, the alternator 22 sits in the same chamber with the rotor 25. The alternator is bolted to the support beam or support plate 26 at the bottom of the alternator instead of at the top of the alternator as shown in the previous slide.

Figure 10:
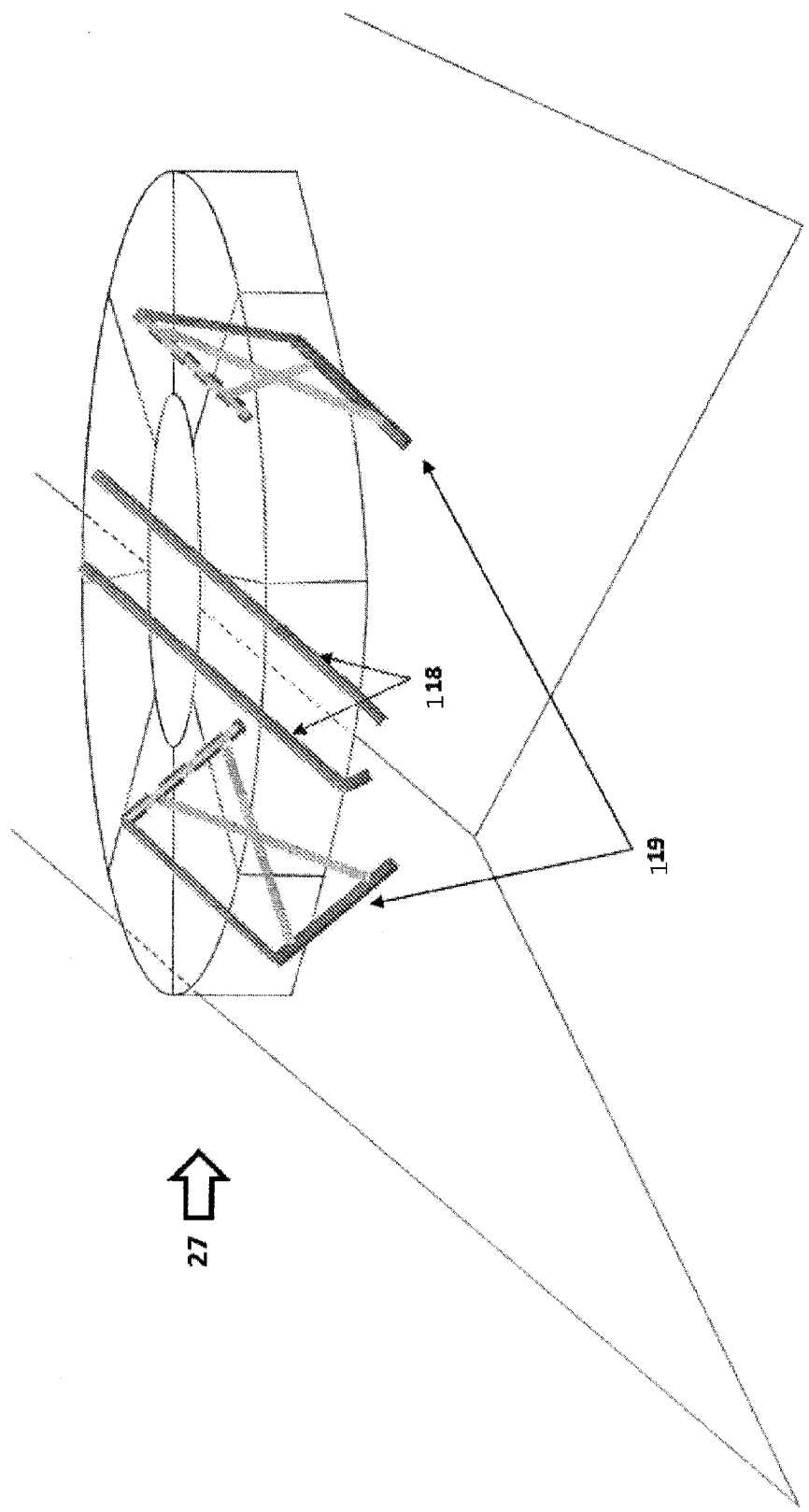
FIG. 10 illustrates an example of how a wind energy system according to the embodiment can be affixed to a structure such as a roof.

FIG. 10 shows one example of how a wind-catching device 27 according to the embodiment can be mounted to the crest of an angled roof. In this embodiment, device 27 includes mounting rails 118, 119 at the bottom. The rails can be "S" shaped or any other shape. The rails preferably follow the dimensions as those standardized by the solar industry for solar panels. For example, standard solar panel mounts 119 (such as those provided Professional Solar Products of Oxnard, Calif.) can be used for harnessing the unit on the roof. Many other types of mounts and positions will become apparent to those skilled in the art after being taught by this example. In this illustrated example, the inner mounting 118 is close to the roof. The outer mounting 119 is not as close to the roof as 118 and may have to be at an angle to mount it properly on a tapered roof. It should be apparent however, that on a flat roof the inner mounting 118 and the outer mounting 119 can be of the same height. Other forms of mounting can be created using simple structures similar to legs of a table. These legs can be mounted to the side or other appropriate location on the structure.

Figure 9:
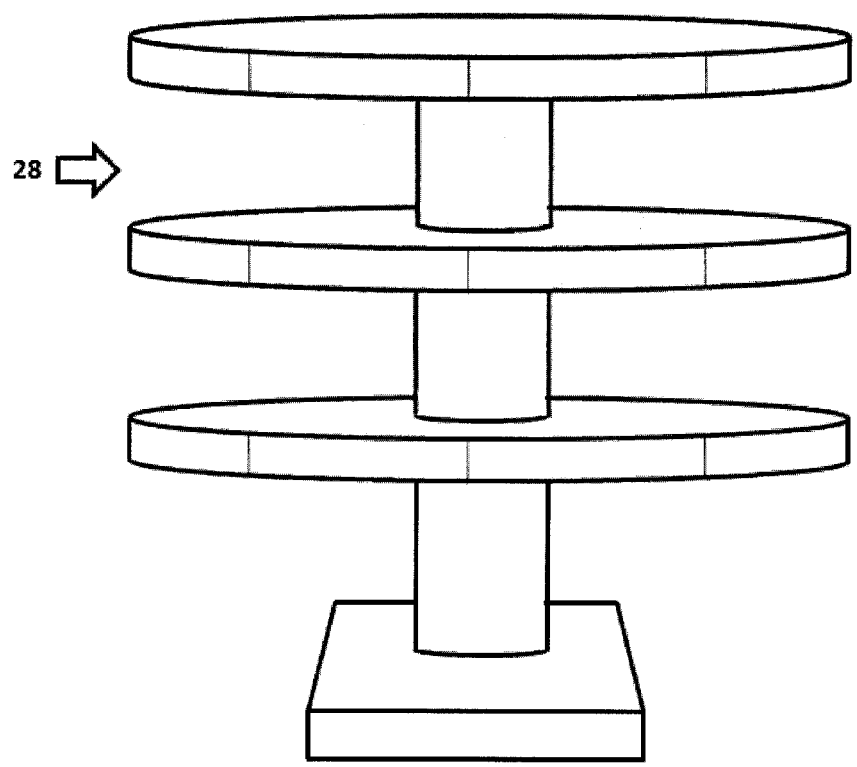
FIG. 9 illustrates an example of how a plurality of wind energy apparatuses can be combined together in a system such as being mounted on a pole.

As shown in FIG. 9, two or more wind-catching devices can be mounted on a single pole to form a wind-catching tower 28. The figure shows three such units mounted on a central pole with a base plate for support; however any suitable number is possible.

It should be noted that the instant disclosure is not limited to devices that capture wind from all directions. For example, embodiments with as few as one segment 18 can be used to capture wind to be used for energy, ventilation, etc. In one possible embodiment, segment 18 can be used in place of an attic cooler inlet which is found commonly on may sloped roofs.

Figure 11:
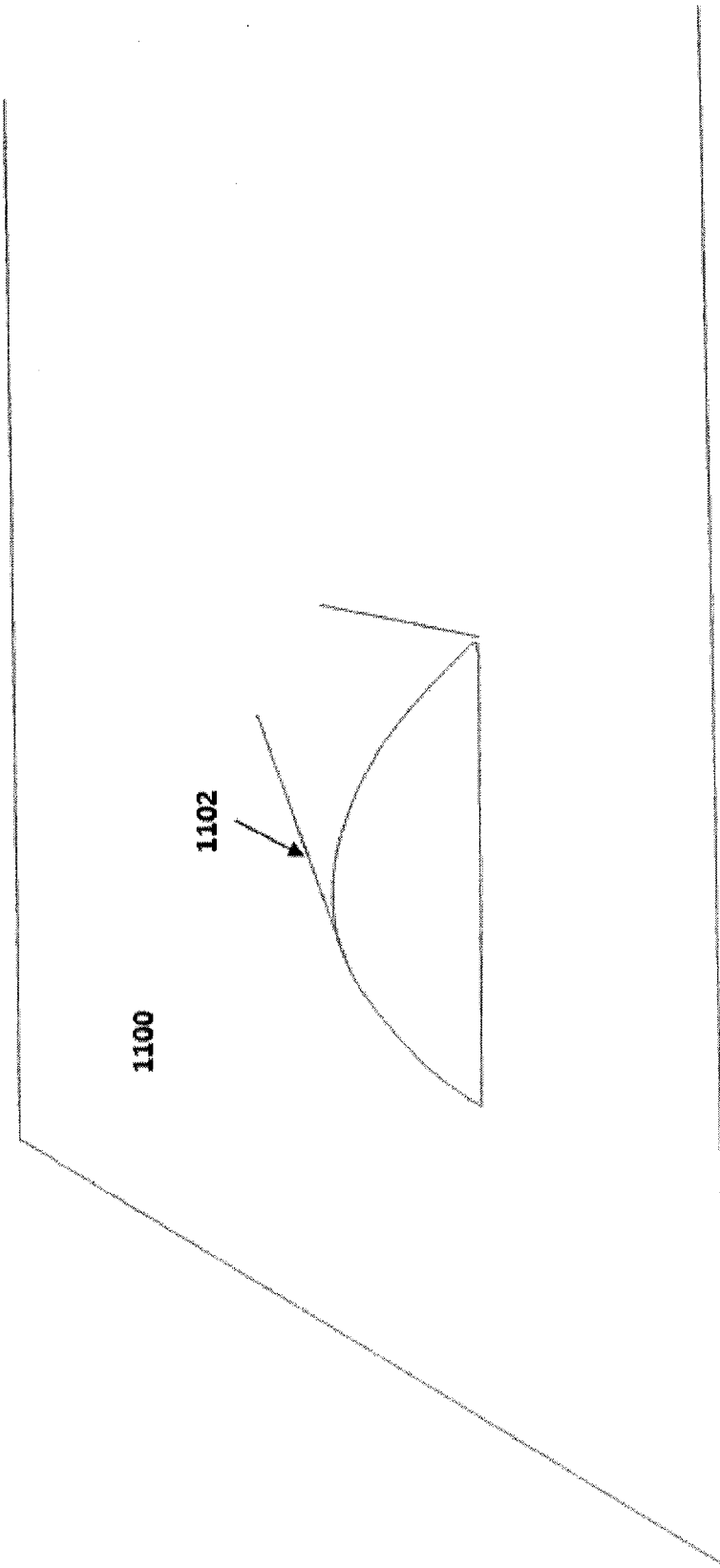
FIG. 11 and FIG. 12 illustrates an example of how a wind catching and accelerating segment of the embodiment can be adapted to be similar to existing slanted roof structures such as Dormer or other vents.

FIG. 11 illustrates that many implementations in the form of a Dormer vent 1102 and a Gable vent are also possible. These vents could have the general features of one or more segments 18 described above and can be used to collect wind on a roof 1100, generate electricity, and provide necessary cooling needed. The Dormer structure would have to be modified to suit the segment. The inner structure (e.g. 12 and 24) would also have to be modified to suit the single or fewer segments. The air exhaust system could also be tied to a climate system or a duct to exhaust the air out again.

Advantages and benefits of the instant apparatus are many. For example, using power storage mechanisms together with the embodiment, utilities can provide reliable clean power to their consumers. Individuals can benefit by reducing their electrical bills by offsetting their electrical usage from the embodiments by connecting their electrical devices via inverters to the apparatus. Individuals can also benefit by charging batteries to create a reliable alternate source of power and create a buffer for loads and power. Communities can benefit the same way individuals can. Farmers can also benefit the same way individuals can. Farmers can also power their farming equipment. Industry can benefit the same way individuals can. Industry can also create an uninterruptable power supply (UPS) using the apparatus and charge a bank of batteries which can provide power in case the grid power goes down. To use the apparatus, a person would assemble the wind catcher 2 or 3 with the inner structure 20. Using mounting devices such as 118 and 119, the person would assemble this on some structure such as a roof or a pole or stack them on a pole or other structure. Using the power generation module enclosed in 24 the person would start producing power. This power could be used for power appliances with an inverter, charging batteries, operating electrical devices such as cooling or heating elements or other electrical loads.

One apparent benefit of the current apparatus is that it is more efficient and helps conserve energy sources that would otherwise be used by an user such as electricity, coal and biofuel. Hence, the current invention helps conserve existing energy and harness wind energy in an efficient way. Other advantages of the instant disclosure include benefits such as safety. Since the moving rotor is enclosed within the structure, wildlife is protected from it. The rotor inside can be further protected using wire mesh on all openings of the structure or simply on the outside only opening of each of the segments or inside only opening of each of the segments of the structure. Other benefits include reduced noise as compared to other wind energy devices, and no "light strobes" as the turbine does not rotate in and out of a light source such as the sun.

Although the present instant disclosure has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A wind capturing apparatus, the apparatus comprising:
a plurality of wind catching segments disposed in a circumferential direction around a center position, each segment comprising:
an exterior opening configured to receive wind;
an interior opening disposed between the exterior opening and the center position, the interior opening facing the exterior opening;
a top wall;
a bottom wall;
a pair of sidewalls connecting the top wall and the bottom wall to define a channel between the openings, the channel being configured to direct substantially all of a volume of air entering the exterior opening to the interior opening to thereby accelerate a velocity of the air between the exterior opening and the interior opening; and
a power generating apparatus configured to receive wind passing through the interior opening to drive a rotor for power generation,
wherein the pair of sidewalls extend toward the interior opening in a direction so as to taper inwardly toward a centerline of the channel at an angle to a radial line extending between an edge of the exterior opening in the circumferential direction and the center position.

2. The wind capturing apparatus according to claim 1, further comprising:
an electrical power generator for converting rotational power into electrical power; and
a shaft that connects the electrical power generator to the rotor.

3. The wind capturing apparatus according to claim 2, wherein the electrical power generator generates alternating current power.

4. The wind capturing apparatus according to claim 2, wherein the electrical power generator generates direct current power.

5. The wind capturing apparatus according to claim 2, further comprising a solar panel mounted on the wind catching segments to provide a second source of electrical power.

6. A wind capturing apparatus, the apparatus comprising:
a plurality of wind catching segments disposed in a circumferential direction around a center position, each segment comprising:
an exterior opening configured to receive wind;
an interior opening disposed between the exterior opening and the center position, the interior opening facing the exterior opening;
a top wall;
a bottom wall;
a pair of sidewalls connecting the top wall and the bottom wall to define a channel between the openings, the channel being configured to direct substantially all of a volume of air entering the exterior opening to the interior opening to thereby accelerate a velocity of the air between the exterior opening and the interior opening; and
an exhaust structure configured to divert wind exiting the interior opening into a duct of a building structure to provide ventilation,
wherein the pair of sidewalls extend toward the interior opening in a direction so as to taper inwardly toward a centerline of the channel at an angle to a radial line extending between an edge of the exterior opening in the circumferential direction and the center position.

7. The wind capturing apparatus according to claim 6, further comprising at mesh structure to prevent debris from entering the exterior opening or the interior opening.

8. A wind capturing apparatus, the apparatus comprising:
a plurality of wind catching segments disposed in a circumferential direction around a center position, each segment comprising:
an exterior opening configured to receive wind;
an interior opening disposed between the exterior opening and the center position, the interior opening facing the exterior opening;
a top wall;
a bottom wall;
a pair of sidewalls connecting the top wall and the bottom wall to define a channel between the openings, the channel being configured to direct substantially all of a volume of air entering the exterior opening to the interior opening to thereby accelerate a velocity of the air between the exterior opening and the interior opening; and
a solar panel disposed on of the wind capturing apparatus,
wherein the pair of sidewalls extend toward the interior opening in a direction so as to taper inwardly toward a centerline of the channel at an angle to a radial line extending between an edge of the exterior opening in the circumferential direction and the center position.

9. The wind capturing apparatus according to claim 8, further comprising a power generating apparatus configured to receive wind passing through the interior opening to drive a rotor for power generation.

10. The wind capturing apparatus according to claim 9, further comprising:
an electrical power generator for converting rotational power into electrical power; and
a shaft that connects the electrical power generator to the rotor.

11. The wind capturing apparatus according to claim 10, wherein the electrical power generator generates alternating current power.

12. The wind capturing apparatus according to claim 10, wherein the electrical power generator generates direct current power.

* * * * *